Patented Oct. 28, 1930

1,779,687

UNITED STATES PATENT OFFICE

WILLIAM J. BANNISTER, OF TERRE HAUTE, INDIANA, ASSIGNOR TO COMMERCIAL SOLVENTS CORPORATION, OF TERRE HAUTE, INDIANA, A CORPORATION OF MARYLAND

DENATURED ALCOHOL

No Drawing.    Application filed December 2, 1927.    Serial No. 237,344.

My invention relates to denatured alcohol compositions and pertains specifically to compositions compounded in such a manner that the alcohol is made unpotable, while at the same time giving an alcohol that is suitable for a number of industrial uses such as liniments, rubbing lotions, perfumes, toilet water, etc.

It is highly desirable that the denaturant used and the resulting denatured alcohol which is to be employed in the manufacture of products such as those enumerated above should possess among others the following properties:

1. The denaturant should not be separable by distillation.
2. The denaturant should be perfectly miscible in 90% alcohol with extensive separation on dilution to drinking strength.
3. The denaturant used should be odorless or possess only a faintly pleasant odor.
4. The alcohol should retain a persistent bad taste.

The materials used as denaturants of ethyl alcohol in the past fulfill only partially these requirements. For example, diethyl phthalate which has commonly been used in the preparation of certain grades of denatured alcohol, is easily separated from the alcohol by redistillation. I have now discovered that butyl chloride is a suitable denaturant for the purposes mentioned.

The advantages in the use of butyl chloride as a denaturing agent are that it meets admirably all of the requirements listed above and in addition is a substance which is easily and economically produced. Butyl chloride imparts a slightly burning, disagreeable taste to ethyl alcohol. On distillation the butyl chloride comes over with the alcohol and the latter retains its disagreeable taste. Immediately upon dilution to about 90 proof, and for several hours thereafter, alcohol which has been denatured with butyl chloride changes into a milky appearing liquid, thus indicating the presence of a foreign substance. Butyl chloride imparts a faint odor to alcohol, barely distinguishable from that of pure alcohol, and pleasant rather than objectionable. Mixtures of ethyl alcohol and butyl chloride are entirely without irritating effecting on the skin.

If desired, certain other substances such as brucine sulphate may be used with butyl chloride to increase the degree of unpotability or for any other purpose. In place of brucine sulphate, any other substance forming a homogeneous solution with ethyl alcohol and butyl chloride and which has no harmful physiological effect on the skin or when accidentally introduced into the body by means of abrasions or cuts in the skin, may be employed.

As example of the use of butyl chloride I may employ:

Example I

Ethyl alcohol_____ 100 gallons
Butyl chloride_____ 1-5 gallons

Example II

Ethyl alcohol_____ 100 gallons
Normal butyl chloride_____ 2.5 gallons
Brucine sulphate_____ 3 ounces It is understood that the proportions used in the examples above are given by way of example and may be varied to a considerable extent.

Now having described my invention, I claim the following as new and novel.

1. Denatured alcohol containing 1-5 gallons of normal butyl chloride to 100 gallons of ethyl alcohol.
2. Denatured alcohol containing 2.5 gallons of normal butyl chloride and 3 ounces of brucine sulphate to 100 gallons of ethyl alcohol.
3. The method of denaturing ethyl alcohol which comprises adding thereto normal butyl chloride.
4. The method of denaturing ethyl alcohol which comprises adding thereto normal butyl chloride and brucine sulphate.

In testimony whereof I affix my signature.

WILLIAM J. BANNISTER.